(12) United States Patent
Liu (10) Patent No.: US 8,517,206 B2
(45) Date of Patent: Aug. 27, 2013

(54) HIGH PRESSURE STORAGE VESSEL

(75) Inventor: Qiang Liu, Irvine, CA (US)

(73) Assignee: Quantum Fuel Systems Technologies Worldwide Inc., Irvine, CA (US)

( * ) Notice: Subject to any disclaimer, the term of this patent is extended or adjusted under 35 U.S.C. 154(b) by 436 days.

(21) Appl. No.: 12/468,736

(22) Filed: May 19, 2009

(65) Prior Publication Data

US 2010/0294776 A1    Nov. 25, 2010

(51) Int. Cl.
*F17C 1/04* (2006.01)
*F17C 1/06* (2006.01)

(52) U.S. Cl.
USPC ............ 220/590; 220/4.13; 220/560.04; 220/560.05; 220/589; 220/591; 220/592; 220/901

(58) Field of Classification Search
USPC ............ 220/4.12–4.17, 88.1, 560.03–567.3, 220/581, 586, 589–592, 651–654, 901, DIG. 24, 220/561, 562, 584; 244/172.2, 172.3; 62/46.3
See application file for complete search history.

(56) References Cited

U.S. PATENT DOCUMENTS

| | | | | |
|---|---|---|---|---|
| 2,337,049 A | * | 12/1943 | Jackson | 220/679 |
| 2,479,828 A | * | 8/1949 | Geckler | 60/255 |
| 2,614,058 A | * | 10/1952 | Francis | 156/171 |
| 2,744,043 A | * | 5/1956 | Ramberg | 156/155 |
| 2,858,992 A | * | 11/1958 | Wentz | 242/436 |
| 3,024,938 A | * | 3/1962 | Watter | 220/4.12 |
| 3,047,191 A | * | 7/1962 | Young | 220/588 |
| 3,062,402 A | * | 11/1962 | Farrell et al. | 220/652 |
| 3,163,183 A | * | 12/1964 | Sagara | 138/144 |
| 3,228,549 A | * | 1/1966 | Courtney | 220/589 |
| 3,372,075 A | * | 3/1968 | Holt et al. | 156/172 |
| 3,490,718 A | * | 1/1970 | Vary | 244/171.8 |
| 3,828,608 A | * | 8/1974 | Yamamoto | 73/37 |
| 3,969,812 A | * | 7/1976 | Beck | 29/421.1 |
| 4,438,858 A | * | 3/1984 | Grover | 220/590 |
| 4,566,589 A | * | 1/1986 | Poschinger | 206/0.6 |
| 4,602,722 A | * | 7/1986 | Ives | 220/567.1 |
| 4,660,738 A | * | 4/1987 | Ives | 220/567.1 |
| 4,785,956 A | * | 11/1988 | Kepler et al. | 220/590 |
| 4,925,053 A | * | 5/1990 | Fenton et al. | 220/88.1 |
| 4,988,011 A | * | 1/1991 | Fenton et al. | 220/88.1 |
| 5,012,950 A | * | 5/1991 | Knappe | 220/567.3 |
| 5,025,943 A | * | 6/1991 | Forsman | 220/589 |
| 5,228,585 A | * | 7/1993 | Lutgen et al. | 220/4.14 |
| 5,499,739 A | * | 3/1996 | Greist et al. | 220/589 |
| 5,526,994 A | * | 6/1996 | Murphy | 242/437.3 |
| 5,651,474 A | * | 7/1997 | Callaghan et al. | 220/565 |
| 5,653,358 A | * | 8/1997 | Sneddon | 220/590 |
| 5,797,513 A | * | 8/1998 | Olinger et al. | 220/592.27 |
| 5,822,838 A | * | 10/1998 | Seal et al. | 29/469.5 |

(Continued)

FOREIGN PATENT DOCUMENTS

| | | |
|---|---|---|
| DE | 10325598 A1 * | 11/2004 |
| KR | 10-2002-0095773 | 12/2002 |
| WO | WO 2008-031471 | 3/2008 |

*Primary Examiner* — J. Gregory Pickett
*Assistant Examiner* — Ned A Walker
(74) *Attorney, Agent, or Firm* — Raymond Sun (57) ABSTRACT

Disclosed herein is a composite pressure vessel with a liner having a polar boss and a blind boss a shell is formed around the liner via one or more filament wrappings continuously disposed around at least a substantial portion of the liner assembly combined the liner and filament wrapping have a support profile. To reduce susceptible to rupture a locally disposed filament fiber is added.

18 Claims, 5 Drawing Sheets

(56) References Cited

U.S. PATENT DOCUMENTS

| | | | |
|---|---|---|---|
| 5,871,117 A * | 2/1999 | Protasov et al. | 220/592 |
| 6,230,922 B1 * | 5/2001 | Rasche et al. | 220/586 |
| 6,444,071 B1 * | 9/2002 | Ayorinde | 156/155 |
| 6,729,492 B2 * | 5/2004 | Gulati | 220/560.04 |
| 6,796,453 B2 * | 9/2004 | Sanders | 220/581 |
| 7,086,553 B2 * | 8/2006 | Debecker et al. | 220/589 |
| 7,159,738 B2 * | 1/2007 | Luongo | 220/586 |
| 7,418,782 B2 * | 9/2008 | Kimbara et al. | 29/890.03 |
| 8,074,826 B2 * | 12/2011 | Cronin et al. | 220/589 |
| 2004/0195246 A1 * | 10/2004 | Immel et al. | 220/560.12 |
| 2006/0065676 A1 * | 3/2006 | Oyen et al. | 222/336 |
| 2007/0159345 A1 * | 7/2007 | Sirosh et al. | 340/612 |
| 2009/0236349 A1 * | 9/2009 | Mueller et al. | 220/590 |

\* cited by examiner

HIGH PRESSURE STORAGE VESSEL

This disclosure was made with Government support under Contract no. DE-FC36-04GO14010, awarded by the Department of Energy. The Government has certain rights in this disclosure.

BACKGROUND

Field

This disclosure relates to high pressure storage devices and processes of manufacture. More particularly, this disclosure relates to improved methods of fabricating composite pressure vessels with internal liners for storage of hydrogen, natural gas, or other gases or liquids, specifically with respect to improvements in high-weight and high-cost efficiency manufacturing methodology.

SUMMARY

According to at least some aspects of some implementations, disclosed is a composite pressure vessel, comprising: a liner assembly having a non-homogenous support profile; and a shell, further comprising: at least one continuous and general layer of a filament wrap disposed around the liner assembly; and at least one non-continuous and local fiber segment.

The location of the at least one fiber segment may correspond to an area of the liner assembly that is more susceptible to rupture than other areas of the liner assembly, according to the non-homogenous support profile. The at least one at least one continuous and general layer of a filament wrap and the at least one non-continuous and local fiber segment may be disposed in alternating layers on the liner assembly.

Complementary pairs of fiber segments may be disposed with respective angles of ±φ relative to a principal axis extending through the composite pressure vessel. The complementary pairs of fiber segments may be configured to address a non-homogenous stress distribution profile of the composite pressure vessel.

The at least one fiber segment may form a hoop disposed axially about a principal axis extending through the composite pressure vessel, wherein each portion of the hoop may be substantially perpendicular to the principal axis. The hoop may be configured to address a non-homogenous stress distribution profile of the composite pressure vessel.

The filament wrap may comprise a filament wound fiber and a resin. The filament wound fiber may comprise at least one inorganic or organic fiber. The inorganic or organic fiber may comprise at least one of carbon, glass, basalt, boron, aramid, Kevlar, high-density polyethylene (HDPE), and nylon.

The fiber segment may comprise a dry fiber impregnated with a resin. The dry fiber comprises at least one inorganic or organic fiber. The inorganic or organic fiber may comprise at least one of carbon, glass, basalt, boron, aramid, Kevlar, high-density polyethylene (HDPE), PP, PE, PET, PEN, zylon, and nylon. The resin may comprise at least one of a thermoset polymer resin and a thermoplastic polymer resin.

Each of the at least one layer of a filament wrap and the at least one fiber segment may be disposed with axial symmetry about a principal axis.

According to at least some aspects of some implementations, disclosed is a composite pressure vessel, comprising: a liner assembly, further comprising: a liner; at least one of a polar boss and a blind boss; and a shell, further comprising: at least one layer of a filament wrap continuously disposed around at least a substantial portion of the liner assembly, wherein the liner assembly and the filament wrap combined have a non-homogenous support profile; and at least one fiber segment locally disposed on an area of the liner assembly and the at least one layer of a filament wrap that is more susceptible to rupture than other areas of the liner assembly, according to the non-homogenous support profile.

The liner may be at least one of a plastic liner and a metal liner configured as a gas barrier. The polar boss may be a metal fitting directly attached to the liner and is configured to provide a connection to a valve system. The composite pressure vessel may be configured for storage of gas or liquid and further configured for any on-board or stationary application.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

One of the primary issues associated with implementation of gaseous fueled vehicles and the like is in manufacturing components at cost and weight that can be borne by the consumer and industry. A significant portion of the cost of the vessel is taken by raw material cost.

High-pressure storage vessels may be made by wrapping fiber composites around a liner assembly 20, which is used as a mandrel. To support high pressure (3,000 to 10,000 or greater PSI service pressure) within the storage vessel, and to maintain safety of operation, greater amounts of material must be used to provide greater support. An increase in the amount of material used results in the penalty of increased weight and material cost.

Figure 1:
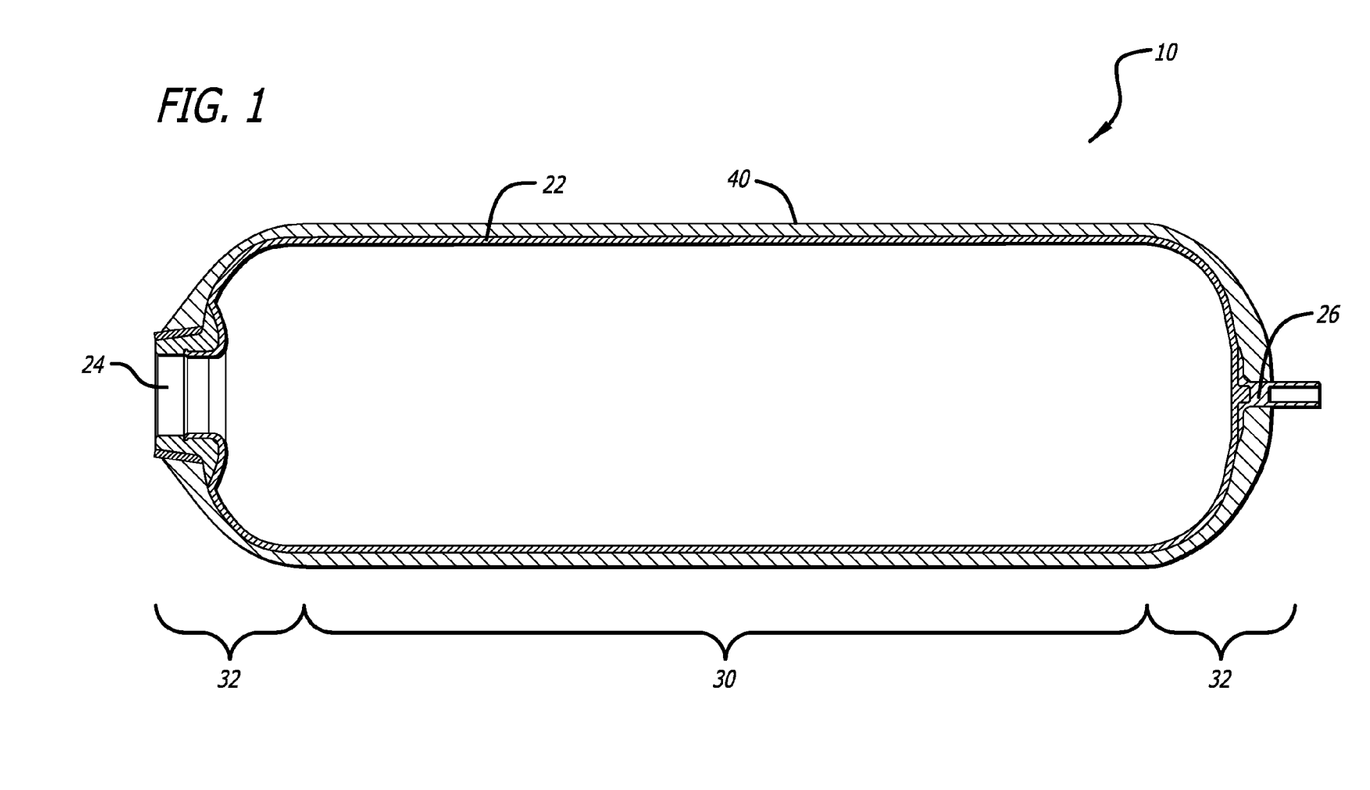
FIG. 1 shows a cross-sectional view of an implementation of a pressure vessel with composite wrapped around the liner assembly.
Figure 2:
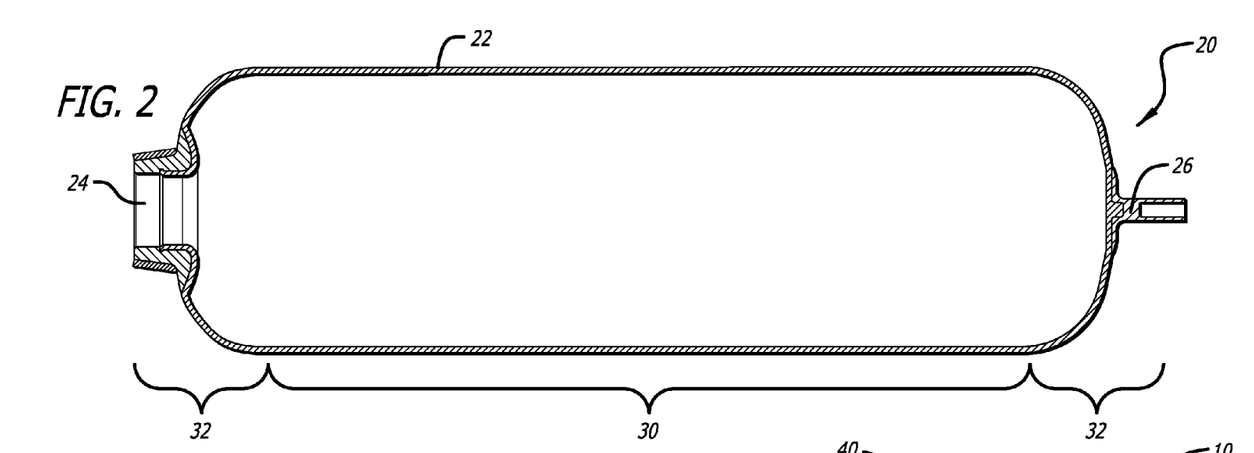
FIG. 2 shows a cross-sectional view of an implementation of a pressure vessel with liner assembly with polar boss on one dome and blind boss on another dome.

According to at least some aspects of some implementations, pressure vessel 10 comprises liner assembly 20 configured to enclose a gas or liquid and a shell 40 to provide support to liner assembly 20. Pressure vessel 10 may have one of a variety of shapes, including cylindrical, spherical, or combinations thereof. Pressure vessel 10 may be axially symmetric about a principal axis 52 extending along a longitudinal length of pressure vessel 10. According to at least some aspects of some implementations, as shown in FIG. 1, pressure vessel 10 may comprise cylindrical region 30 and two dome regions 32. Other shapes are contemplated and considered within the current disclosure.

According to at least some aspects of some implementations, liner assembly 20 comprises liner 22, and at least one of polar boss 24 and blind boss 26. Liner 22 may be composed of plastic, metal, or other materials to contain a gas or liquid. According to at least some aspects of some implementations, liner 22 may be impermeable with respect to selected contents of pressure vessel 10. According to at least some aspects of some implementations, the shape of liner assembly 20 may contribute to the shape of pressure vessel 10.

Figure 3:
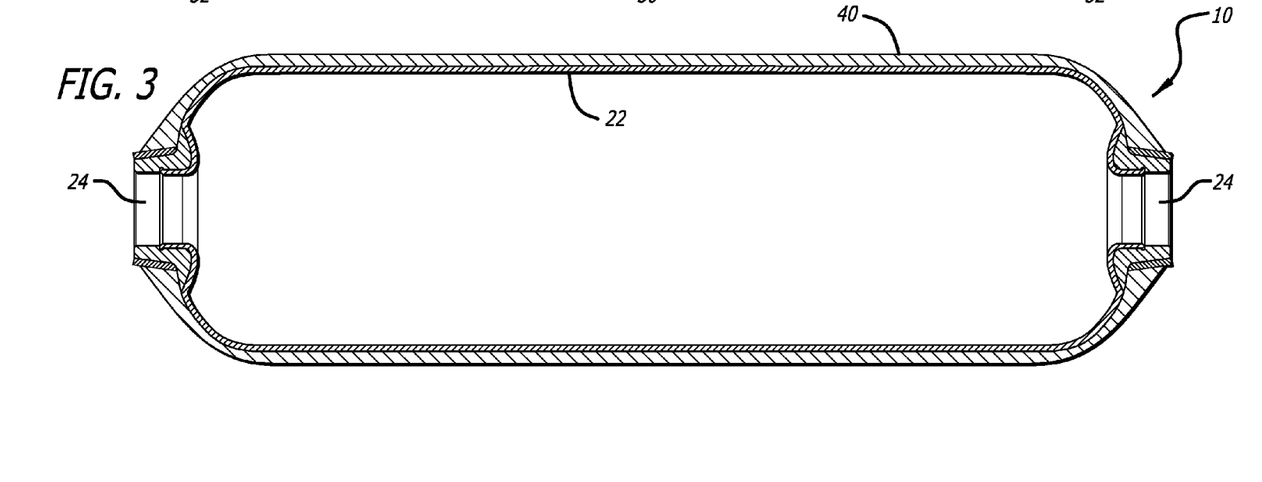
FIG. 3 shows a cross-sectional view of an implementation of a pressure vessel with Tank inside which the liner assembly has polar boss on both domes.
Figure 4:
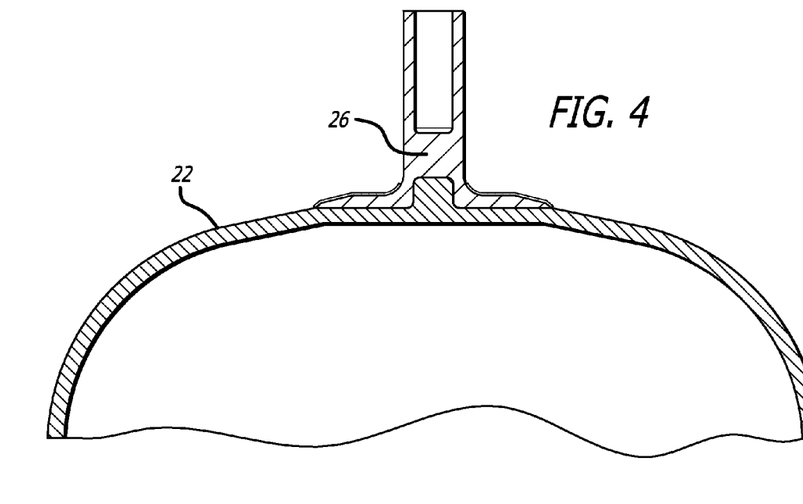
FIG. 4 shows a cross-sectional view of an implementation of a dome region of a pressure vessel having a blind boss.
Figure 5:
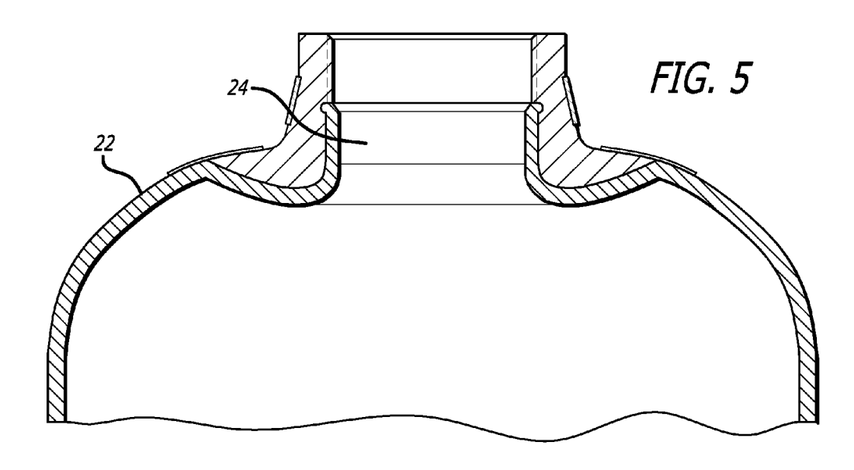
FIG. 5 shows a cross-sectional view of an implementation of a dome region of a pressure vessel having a polar boss.

At least one of polar boss 24 and blind boss 26 may be disposed near at least one end of liner assembly 20. For example, as shown in FIG. 1, polar boss 24 may be disposed at one end and blind boss 26 may be disposed at an opposite end. For example, as shown in FIG. 3, one polar boss 24 may be disposed at each of two ends. As shown in FIG. 5, polar boss 24 may provide selective access to the interior portion of liner assembly 20 for providing or discharging the contents of pressure vessel 10. Polar boss 24 may be configured to provide a connection to a valve system. Polar boss 24 may be made of metal or other durable material. As shown in FIG. 4, blind boss 26 may provide support to liner 22. Polar boss 24 and blind boss 26 may allow liner assembly 20 to be supported and rotated about its principal axis 52 as a mandrel.

According to at least some aspects of some implementations, pressure vessel 10 comprises shell 40. Shell 40 provides support to liner assembly 20 against deformation and rupture due to pressure from within liner assembly 20. Shell 40 may comprise at least one of filament wrap 42 and fiber segment 44. According to at least some aspects of some implementations, shell 40 may comprise alternating layers of filament wrap 42 and fiber segments 44. Either one of filament wrap 42 and fiber segment 44 may provide an innermost layer or an outermost layer.

According to at least some aspects of some implementations, filament wrap 42 may form a continuous wrap around more than one full rotation of liner assembly 20 about its principal axis 52 or along more than one longitudinal length of liner assembly 20. Filament wrap 42 may form a general layer around liner assembly 20, such that a substantial portion of liner assembly 20 may be covered by filament wrap 42.

According to at least some aspects of some implementations, at least one of liner assembly 20, filament wrap 42, and fiber segments 44 may have a non-homogenous support profile. A support profile may be defined as an evaluation at every point on the surface of a structure such as a liner assembly 20 (or a wound liner) of the protection against deformation and rupture due to pressure from within the structure. A non-homogenous support profile implies that certain points are more or less susceptible to deformation and rupture than other points on the surface of the structure. Such points are determinable using, at least in part, computational or experimental means discussed herein.

According to at least some aspects of some implementations, liner assembly 20 with at least one layer of filament wrap 42 may have a non-homogenous support profile. While filament wrap 42 may provide generally increased support against rupture, the support profile may nonetheless have absolute or relative deficiencies. According to at least some aspects of some implementations, because some regions on liner assembly 20 with at least one layer of filament wrap 42 have variable radius of curvature, and the stress condition changes as the radius of curvature changes, one layer of filament wrap 42 may not be able to reinforce all of the regions it covers.

According to at least some aspects of some implementations, at least one fiber segment 44 may be included in shell 40. Fiber segments 44 may be present in shell 40 in non-continuous segments, such that the segments do not wrap around substantially more than one full rotation of liner assembly 20 about its principal axis 52 or along substantially more than one longitudinal length of liner assembly 20. Fiber segments 44 may be present locally within shell 40, such that each fiber segment 44 does not cover a substantial portion of liner assembly 20. Rather, the locality of fiber segment 44 may correspond to an area in which support provided by filament wrap 42 alone is insufficient for a desired purpose or relatively insufficient compared to other areas, according to the general and continuous coverage of filament wrap 42. Such absolute or relative deficiency is determinable by computational or experimental methods and may correspond to a non-homogenous support profile of liner assembly 20 alone or a non-homogenous support profile of liner assembly 20 with filament wrap 42.

According to at least some aspects of some implementations, at least one of liner assembly 20, filament wrap 42, and fiber segments 44 may have a non-homogenous stress distribution profile. A stress distribution profile may be defined as an evaluation at every point on the surface of a structure such as a liner assembly 20 (or a wound liner) of a direction in which stress is distributed due to pressure from within the structure. The direction in which stress is distributed may be attributable to the geometry of the structure, and may be expressed as having a multiplicity of contributing components. A non-homogenous stress distribution profile implies that at least one point has a distinct direction in which stress is distributed. Such a profile is determinable based on computational or experimental means, as discussed herein.

According to at least some aspects of some implementations, a stress distribution may have multiple contributing components. A representation of certain conditions at dome region 32 of an implementation of pressure vessel 10 is shown in FIG. 11. For example, at any given point on dome region 32, a radius of curvature in a meridional direction is defined by $R_m$. The meridional direction corresponds to an arc on the surface of principal axis 52 that intersects principal axis 52 at the tip of dome region 32, intersects tangent line 50 at two points, and has bilateral symmetry across principal axis 52. At any given point on dome region 32, a radius of curvature in a parallel direction and disposed axially about principal axis 52 is defined by $R_p$. The parallel direction corresponds to an arc on the surface of dome region 32 that is perpendicular to principal axis 52 at any given point and is disposed axially about principal axis 52. Tangent line 50 is an example of an arc of a parallel direction (see FIGS. 6-10).

The stress balance, p, of a given point on the vessel inner surface may be expressed as:

$$\frac{N_\alpha}{R_m} + \frac{N_\beta}{R_P} = p,$$

where $N_\alpha$ and $N_\beta$ represent the stress of that point in the meridional and parallel directions, respectively.

$R_m$ and $R_P$ can be derived and expressed as:

$$R_m = -\frac{(1+(z')^2)^{3/2}}{z''}$$

and $$R_P = -\frac{r(1+(z')^2)^{1/2}}{z'}$$

where r, z', and z'' are determinable polar coordinates corresponding to the given point.

$N_\alpha$ and $N_\beta$ can be derived and expressed as:

$$N_\alpha = -Q\frac{\sqrt{1+(z')^2}}{rz'}$$

and $$N_\beta = -\frac{\sqrt{1+(z')^2}}{z'}\left(pr - \frac{Qz''}{z'(1+(z')^2)}\right).$$

where Q is axial stress. Mathematical expressions and derivations are further set forth in Appendix A, the entirety of which is incorporated by reference, as if set forth herein in its entirety.

On pressure vessel 10, near the transition region between cylinder region 30 and dome region 32, there is a sudden change of $R_m$ and $R_P$; also, along the surface of dome region 32, $R_m$ and $R_P$ are constantly varying, therefore the stress condition in these regions is complicated. At each location, for example location A, certain amount and type of reinforcement needs to be placed locally at certain angles; another location, B, even if very close to location A, may require different amount and type of reinforcement placed at different angles to support.

According to at least some aspects of some implementations, WFW is a winding process (i.e. it introduces continuous reinforcement wound into the structure). Therefore if we introduce some material over location A on dome region 32, in order to support the load there to address a non-homogenous support profile, the reinforcement must also cover other regions, such as cylinder region 30, simply because of the continuous nature, even though some of these reinforcement materials are parasitic at other locations except location A.

Figure 6:
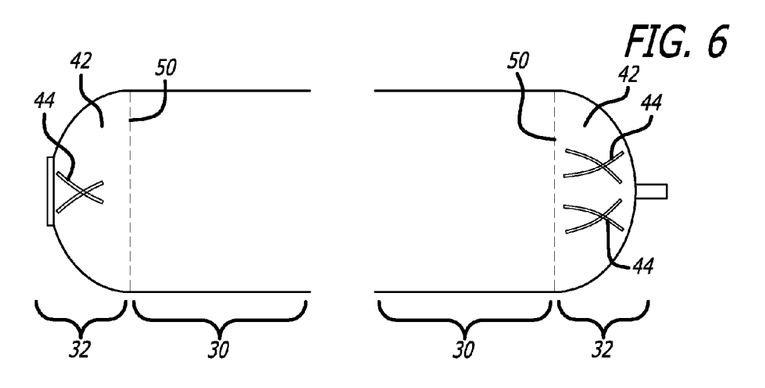
FIG. 6 shows a view of an implementation of a cylinder and dome region of a pressure vessel with AFP placed fiber segments only in the dome region.

According to at least some aspects of some implementations, at least one non-continuous fiber segment 44 may be locally disposed at or near dome region 32 of pressure vessel 10. According to at least some aspects of some implementations and as shown in FIG. 6, tangent line 50 defines the transition between cylinder region 30 and dome region 32.

Figure 7:
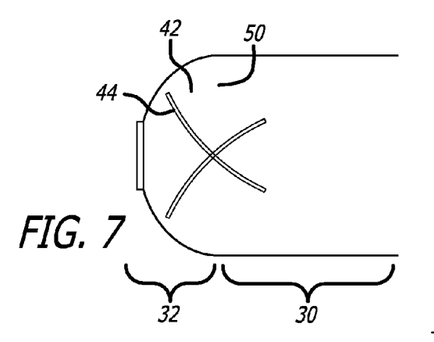
FIG. 7 shows a view of an implementation of a cylinder and dome region of a pressure vessel with AFP placed fiber segments in both the dome region and cylinder region.
Figure 8:
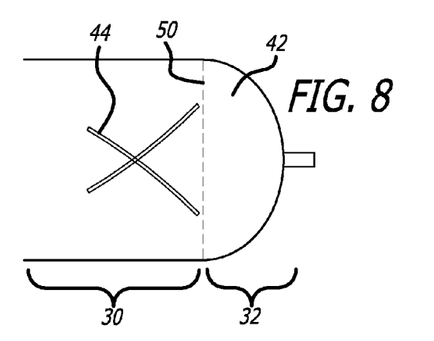
FIG. 8 shows a view of an implementation of a cylinder and dome region of a pressure vessel with AFP placed fiber segments only in the cylinder region.
Figure 9:
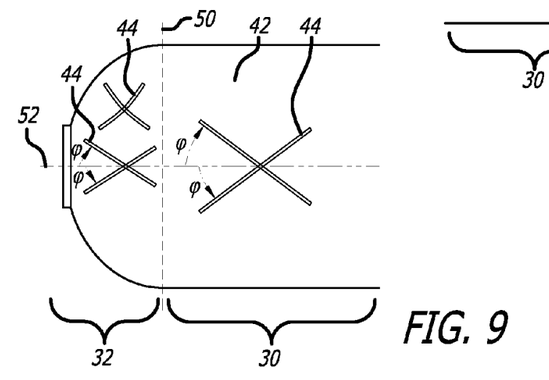
FIG. 9 shows a view of an implementation of a cylinder and dome region of a pressure vessel with AFP placed fiber segments having the same or different angles relative to the principal axis.

According to at least some aspects of some implementations, at least one non-continuous fiber segment 44 is locally disposed at or near dome region 32 of pressure vessel 10. According to at least some aspects of some implementations, pairs of fiber segments 44 may be disposed with bilateral symmetry across principal axis 52, as shown in FIGS. 6-9. As shown in FIG. 6, at least one pair of fiber segments 44 may be disposed entirely on dome region 32. As shown in FIG. 7, a pair of fiber segments 44 may be disposed so as to cross tangent line 50. As shown in FIG. 8, a pair of fiber segments 44 may be disposed entirely on cylinder region 30. As shown in FIG. 9, fiber segments 44 may form a substantially linear shape from which an angle φ relative to principal axis 52 may be determined. Complementary pairs of fiber segments 44 may be disposed with respective angles of ±φ relative to principal axis 52. Pairs of fiber segments 44 may intersect or may provide bilateral symmetry across principal axis 52 without intersecting.

According to at least some aspects of some implementations, fiber segment 44 may be configured to address a non-homogenous stress distribution profile. Angles ±φ may be determined to address a non-homogenous stress distribution profile, where pressure, p, at a given point has a meridional stress component $N_\alpha$ and a parallel stress component $N_\beta$. For example, relatively smaller angles for ±φ (approaching φ=0°) may address a relatively larger meridional stress component $N_\alpha$. Relatively larger angles for for ±φ (approaching φ=90°) may address a relatively larger parallel stress component $N_\beta$. Ideal values for ±φ depend on the geometry of dome region 32, vary across the surface of dome region 32, and are determinable.

Figure 10:
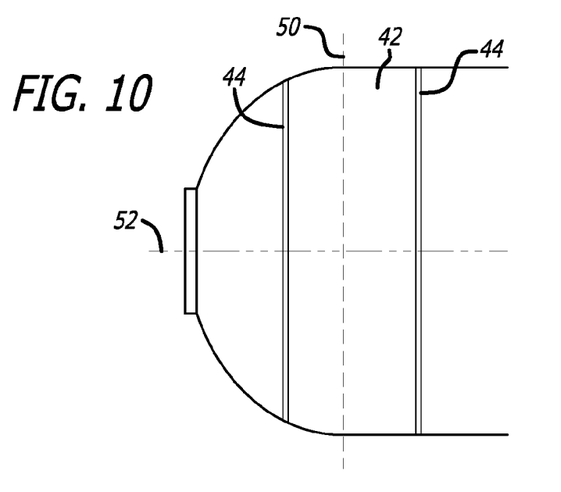
FIG. 10 shows a view of an implementation of a cylinder and dome region of a pressure vessel with AFP placed fiber segments wound in hoop direction in the cylinder region, the dome region, or both.
Figure 11:
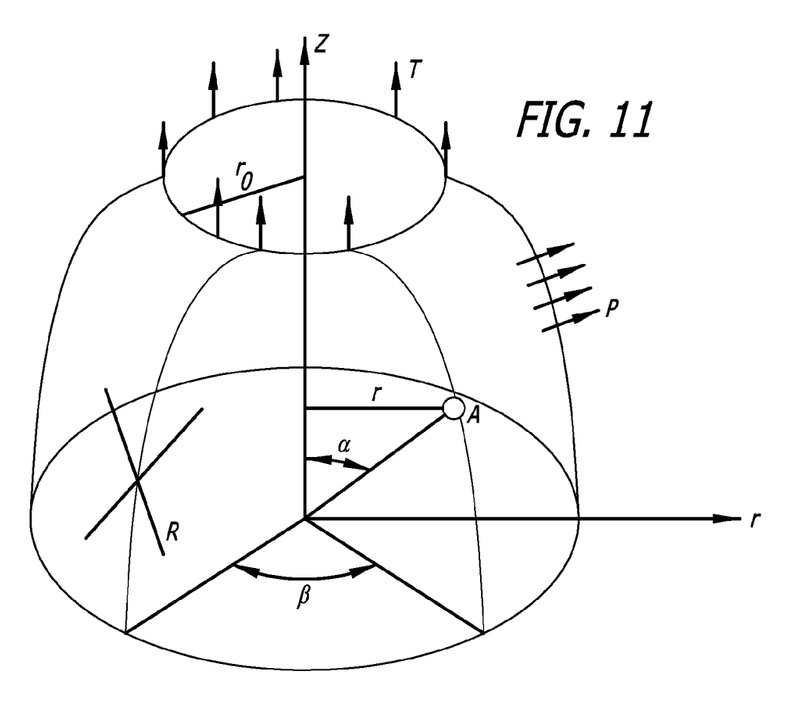
FIG. 11 shows a representation of conditions at a dome region of an implementation of a pressure vessel.

According to at least some aspects of some implementations, hoops of fiber segments 44 may be disposed around pressure vessel 10 with axial symmetry around principal axis 52, as shown in FIG. 10. For example, a hoop may be placed primarily to address a parallel stress component $N_\beta$.

According to at least some aspects of some implementations, filament wrap 42, individual fiber segments 44, pairs of fiber segments 44 having angles ±φ, hoops of fiber segments 44, or combinations thereof are used to address both a non-homogenous support profile and a non-homogenous stress distribution profile.

Wet filament winding (WFW) processes, may be used to manufacturer gas or liquid storage high pressure vessels. Filament winding processes generally involve winding filaments around a mold or mandrel. Filament materials may include fiber tows impregnated with liquid resin just before it is integrated into the structure or a pre-preg fiber tow, i.e., a filament tow with pre-impregnated resins.

According to at least some aspects of some implementations, at least one filament winding process may be used to form shell 40 onto liner assembly 20. According to at least some aspects of some implementations, WFW may be performed to contribute filament wrap 42 to shell 40 of pressure vessel 10. In WFW, liner assembly 20 may act as a mandrel as it rotates about its principal axis 52 while a carriage moves parallel to the principal axis 52 and applies filament wrap 42. The carriage may travel parallel to the principal axis 52 in one or more directions and subsequently travel in an opposite direction while applying a single continuous filament wrap 42 or multiple continuous filament wraps 42. This process may be repeated as desired with one continuous filament wrap 42. The resulting contribution is a filament wrap 42 in helical layers, polar layers, or hoop layers.

According to at least some aspects of some implementations, filament wrap 42 is applied in a desired pattern onto the outer surface of liner assembly 20. For example, filament wrap 42 may be applied in helical layers, polar layers, or hoop layers around liner assembly 20 and along the length of liner assembly 20. The pattern may be applied in a regular repeating manner to provide symmetrical distribution of support against high pressures. The pattern may also be varied so that successive layers are plied or oriented differently, to provide diverse and comprehensive coverage. The angle at which material is applied during WFW contributes to the properties of the final product. These properties may be determined from analytical and numerical stress analysis. From stress analysis, it may become clear where the material needs to be placed at given angles in order to reinforce a given region. WFW is well suited to automation.

According to at least some aspects of some implementations, the placement during WFW is general, in that a substantial portion of liner assembly 20 may be covered by WFW. According to at least some aspects of some implementations, the placement during WFW is continuous, in that a single phase of WFW may be used to wrap around more than one full rotation of liner assembly 20 about its principal axis 52 or along more than one longitudinal length of liner assembly 20.

According to at least some aspects of some implementations, filament wrap 42 comprises a filament wound fiber, such as either inorganic or organic fiber. Examples include carbon, glass, basalt, boron, aramid, Kevlar, high-density polyethylene (HDPE), zylon, PP, PE, PET, PEN, PBT, and nylon. Other inorganic and organic fibers are contemplated by the present disclosure. According to at least some aspects of some implementations, filament wrap 42 further comprises a resin. The resin may be impregnated onto the filament wound fiber before or as the filament wound fiber is wound onto liner assembly 20.

According to at least some aspects of some implementations, the resin of filament wrap 42 may have a low-viscosity or be in a liquid state as it is impregnated onto the filament wound fiber and applied to liner assembly 20. The resin may be based on Di-Glycidyl Ether of Bisphenol-A (DGEBA), undiluted and non-toughened epoxy resin cured by a mixture of propyl oxide amine and cyclo-aliphatic amine. The low-viscosity may provide flexibility and ease during application. For example, a continuous and automated WFW process may be operated at a more efficient rate where the resin is in a liquid state. According to at least some aspects of some implementations, once the winding process is finished, the whole assembly is placed in an oven to solidify the resin. According to at least some aspects of some implementations, liner assembly 20 is pressurized as the resin is heated and solidified. For example, a pressure within liner assembly 20 may be relatively higher than the pressure outside liner assembly 20, such that liner assembly 20 is expanded and filament wrap 42 is compressed, thereby removing air bubbles during the heating process.

According to at least some aspects of some implementations, the repetitive nature of some filament winding processes may result in parasitic fiber tows in places where they are not needed. For example, filament winding may result in a non-homogenous support profile, where some regions having higher support needs may require greater support. Where filament winding processes are continuous and automated, they do not selectively apply additional materials where greater support is needed. If the amount of material is increased generally to support such regions requiring greater support, then the amount of material overall is increased, including in regions not requiring such additional support. These parasitic materials increase the weight and cost significantly.

According to at least some aspects of some implementations, automated fiber placement (AFP) is used in combination with WFW, to locally introduce non-continuous fiber segments 44 to individual locations. Through computational, experimental, or other stress analysis, locations having absolute or relatively insufficient support via filament winding processes may be determined.

According to at least some aspects of some implementations, fiber segments 44 used in AFP may comprise a dry fiber impregnated with a high-viscosity resin in a gel state. The dry fiber may comprise one or more inorganic or organic materials. Examples include carbon, glass, basalt, boron, aramid, Kevlar, high-density polyethylene (HDPE), zylon, PP, PE, PET, PEN, PBT, and nylon. Other inorganic and organic fibers are contemplated by the present disclosure. The resin may be either thermoset or thermoplastic. The range of viscosities for the high-viscosity resin include any viscosity that is conducive to the placement of the fiber segments 44. For example, the placement during AFP may be made more precise where the resin is in a gel state. According to at least some aspects of some implementations, fiber segment 44 further comprises a toughening agent.

According to at least some aspects of some implementations, fiber segments 44 are heated, applied with pressure, and consolidated on any surface by at least one roller medium. The process causes adhesion of fiber segments 44 to the surface with the resin of fiber segments 44. According to at least some aspects of some implementations, fiber segments 44 are selectively provided at desired locations. Fiber segments 44 may be in the form of single or multiple narrow, slit tapes or tows to make up a given total prepreg band width. According to at least some aspects of some implementations, a fiber segment 44 forms a hoop disposed axially about principal axis 52, wherein each portion of fiber segment 44 is substantially perpendicular to the principal axis 52, as shown in FIG. 10. According to at least some aspects of some implementations, pairs of fiber segments 44 are placed with respective angles of $\pm\phi$ relative to principal axis 52, as shown in FIGS. 6-9. The pairs provide bilateral symmetry across principal axis 52, resulting in balanced support.

According to at least some aspects of some implementations, pressure vessel 10 is configured to store a gas or a liquid. Pressure vessel 10 may be configured to store a fuel for a vehicle. Vehicles include, but are not limited to, any means of conveyance across marine, surface, terrestrial, or other medium. Pressure vessel 10 may be configure for stationary application or on-board vehicle application.

While the apparatus and method have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

The invention claimed is:

1. A composite pressure vessel, comprising:
a liner assembly with at least one dome region having a non-homogeneous support profile, the at least one dome region being more susceptible to rupture from the pressure within said vessel; and
a shell, further comprising:
at least one continuous and general layer of a filament wrap disposed around the liner assembly; and
a plurality of narrow slit tapes or tows positioned on the at least one dome region, each of the slit tapes or tows comprising a dry fiber impregnated with a resin, with at least one pair of the slit tapes or tows disposed with bilateral symmetry across a longitudinal axis of the liner assembly; and wherein the slit tapes or tows are substantially confined to the at least one dome region.

2. The composite pressure vessel of claim 1, wherein the at least one layer of the filament wrap and the slit tapes or tows are disposed in alternating layers on the at least one dome region of the liner assembly.

3. The composite pressure vessel of claim 1, wherein the slit tapes or tows are configured to address a non-homogeneous stress distribution profile of the composite pressure vessel.

4. The composite pressure vessel of claim 1, wherein the dry resin comprises at least one of a thermoset polymer resin and a thermoplastic polymer resin.

5. The composite pressure vessel of claim 1, wherein the at least one pair of the slit tapes or tows overlap one another.

6. The composite pressure vessel of claim 1, wherein the dry fiber comprises at least one inorganic fiber or at least one organic fiber.

7. The composite pressure vessel of claim 6, wherein the at least one inorganic fiber or the at least one organic fiber comprises at least one of carbon, glass, basalt, boron, aramid, Kevlar, high-density polyethylene (HDPE), PP, PE, PET, PEN, zylon, and nylon.

8. The composite pressure vessel of claim 1, wherein the at least one layer of the filament wrap comprises a filament wound wrap fiber and a wrap resin.

9. The composite pressure vessel of claim 8, wherein the filament wound wrap fiber comprises at least one inorganic fiber or at least one organic fiber.

10. The composite pressure vessel of claim 9, wherein the at least one inorganic fiber or the at least one organic fiber comprises at least one of carbon, glass, basalt, boron, aramid, Kevlar, high-density polyethylene (HDPE) and nylon.

11. A composite pressure vessel, comprising:
a liner assembly having a cylindrical region, a first dome region opposite a second dome region, the first and second dome regions having a non-homogeneous support profile, and the first and second dome regions are positioned on opposite ends of a cylindrical region, and a first transition region extending between the first dome region and the cylindrical region and a second transition region extending between the second dome region and the cylindrical region; and a shell comprising:
at least one continuous and general layer of a filament wrap disposed around the liner assembly; and
a plurality of narrow slit tapes or tows positioned on the first dome region, the slit tapes or tows each having opposite first and second ends substantially confined to the first dome region, the first transition region, and the cylindrical region, each of the slit tapes or tows comprising a dry fiber impregnated with a resin, with at least one pair of the slit tapes or tows overlapping one another;
wherein the slit tapes or tows substantially overlay the first transition region, with the first end of each of the slit tapes or tows terminating in the first dome region, and the second end of each of the slit tapes or tows positioned within the cylindrical region and spaced from the second dome region.

12. The composite pressure vessel of claim 11, wherein the resin comprises at least one of a thermoset polymer resin and a thermoplastic polymer resin.

13. The composite pressure vessel of claim 11, wherein the at least one pair of slit tapes or tows is disposed with bilateral symmetry across a longitudinal axis of the liner assembly.

14. The composite pressure vessel of claim 11, wherein the dry fiber comprises at least one inorganic fiber or at least one organic fiber.

15. The composite pressure vessel of claim 14, wherein the at least one inorganic fiber or the at least one organic fiber comprises at least one of carbon, glass, basalt, boron, aramid, Kevlar, high-density polyethylene (HDPE), PP, PE, PET, PEN, zylon, and nylon.

16. The composite pressure vessel of claim 11, wherein the at least one layer of the filament wrap comprises a filament wound wrap fiber and a wrap resin.

17. The composite pressure vessel of claim 16, wherein the filament wound wrap fiber comprises at least one inorganic fiber or at least one organic fiber.

18. The composite pressure vessel of claim 17, wherein the at least one inorganic fiber or the at least one organic fiber comprises at least one of carbon, glass, basalt, boron, aramid, Kevlar, high-density polyethylene (HDPE) and nylon.

* * * * *